US009840749B2

(12) United States Patent
Harako et al.

(10) Patent No.: US 9,840,749 B2
(45) Date of Patent: Dec. 12, 2017

(54) HIGH STRENGTH GALVANIZED STEEL SHEET AND METHOD FOR MANUFACTURING THE SAME

(71) Applicant: JFE STEEL CORPORATION, Chiyoda-ku, Tokyo (JP)

(72) Inventors: Daisuke Harako, Kawasaki (JP); Yoshitsugu Suzuki, Fukuyama (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 338 days.

(21) Appl. No.: 14/380,844

(22) PCT Filed: Feb. 25, 2013

(86) PCT No.: PCT/JP2013/001038
§ 371 (c)(1),
(2) Date: Aug. 25, 2014

(87) PCT Pub. No.: WO2013/128867
PCT Pub. Date: Sep. 6, 2013

(65) Prior Publication Data

US 2015/0017474 A1 Jan. 15, 2015

(30) Foreign Application Priority Data

Mar. 2, 2012 (JP) ................................ 2012-046472

(51) Int. Cl.

| | |
|---|---|
| ***B32B 15/00*** | (2006.01) |
| ***C21D 8/00*** | (2006.01) |
| ***C23C 2/02*** | (2006.01) |
| ***C23C 2/06*** | (2006.01) |
| ***C21D 9/46*** | (2006.01) |
| ***C22C 38/14*** | (2006.01) |
| ***C23C 28/00*** | (2006.01) |
| ***C21D 8/02*** | (2006.01) |
| ***B32B 15/01*** | (2006.01) |
| ***C22C 38/00*** | (2006.01) |
| ***C22C 38/02*** | (2006.01) |
| ***C22C 38/04*** | (2006.01) |
| ***C22C 38/12*** | (2006.01) |
| ***C22C 38/06*** | (2006.01) |
| ***C23F 17/00*** | (2006.01) |
| ***C23C 2/28*** | (2006.01) |
| ***C21D 9/56*** | (2006.01) |
| *C22C 18/00* | (2006.01) |

(52) U.S. Cl.

CPC .............. *C21D 8/005* (2013.01); *B32B 15/01* (2013.01); *B32B 15/013* (2013.01); *C21D 8/0205* (2013.01); *C21D 8/0263* (2013.01); *C21D 8/0278* (2013.01); *C21D 9/46* (2013.01); *C21D 9/561* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/28* (2013.01); *C23C 28/321* (2013.01); *C23C 28/345* (2013.01); *C23F 17/00* (2013.01); *C21D 2241/00* (2013.01); *C22C 18/00* (2013.01); *Y10T 428/12799* (2015.01)

(58) Field of Classification Search

None
See application file for complete search history.

(56) References Cited

U.S. PATENT DOCUMENTS 4,985,090 A * 1/1991 Van Perlstein ......... C22C 38/14 148/320
8,241,759 B2 * 8/2012 Nakagaito ............... C22C 38/02 428/336
8,366,844 B2 * 2/2013 Sun ....................... C22C 38/002 148/533
8,834,651 B2 * 9/2014 Matsumura .............. C21D 9/46 148/284

(Continued)

FOREIGN PATENT DOCUMENTS

EP 1 041 167 A1 10/2000
EP 2738280 6/2014

(Continued)

OTHER PUBLICATIONS

Korean Office Action dated May 11, 2016 for Korean Application No. 2014-7024943, including Concise Statement of Relevance, 16 pages.
Japanese Office Action with partial English translation for Application No. 2012-046472, dated Sep. 13, 2016, 4 pages.
Supplementary European Search Report for Application No. EP 13 75 4654 dated Jun. 30, 2015.

(Continued)

*Primary Examiner* — Daniel J Schleis
(74) *Attorney, Agent, or Firm* — RatnerPrestia

(57) ABSTRACT

A high strength galvanized steel sheet has a composition including, C: 0.02% or more and 0.30% or less, Si: 0.01% or more and 2.5% or less, Mn: 0.1% or more and 3.0% or less, P: 0.003% or more and 0.08% or less, S: 0.01% or less, Al: 0.001% or more and 0.20% or less, Ti: 0.03% or more and 0.40% or less and the balance being Fe and inevitable impurities, and a zinc-coated layer having a coating weight per surface of 20 $g/m^2$ or more and 120 $g/m^2$ or less. The concentration ratio of C to Ti (C/Ti) in a portion within 10 μm from the surface of the base steel sheet is 0.8 or more and 1.5 or less, and the total amount of oxides of one or more selected from Fe, Si, Mn, P, Al and Ti formed in a surface portion within 100 μm from the surface of the base steel sheet is 0.05 $g/m^2$ or less.

9 Claims, No Drawings

(56) References Cited

U.S. PATENT DOCUMENTS

| | | | | |
|---|---|---|---|---|
| 2012/0222781 A1* | 9/2012 | Azuma | .................... | C21D 9/46 148/518 |
| 2013/0202801 A1* | 8/2013 | Suzuki | ..................... | C21D 1/76 427/329 |

FOREIGN PATENT DOCUMENTS

| | | | | |
|---|---|---|---|---|
| JP | 2001-323355 | A | | 11/2001 |
| JP | 2002-322543 | A | | 11/2002 |
| JP | 2003-321736 | A | | 11/2003 |
| JP | 2009-263774 | A | | 11/2009 |
| JP | 2011-225978 | A | | 11/2011 |
| JP | 2011-241429 | A | | 12/2011 |
| KR | 20010023573 | | | 3/2001 |
| WO | WO2011065591 | | * | 6/2011 |
| WO | WO2011129465 | | * | 10/2011 |
| WO | 2013018739 | | | 2/2013 |

OTHER PUBLICATIONS

International Search Report dated May 7, 2013, application No. PCT/JP2013/001038.

Japanese Office Action dated Feb. 23, 2016 for JP 2012-046472 with Concise Statement of Relevance of Office Action.

* cited by examiner

HIGH STRENGTH GALVANIZED STEEL SHEET AND METHOD FOR MANUFACTURING THE SAME

CROSS REFERENCE TO RELATED APPLICATIONS

This is the U.S. National Phase application of PCT/JP2013/001038, filed Feb. 25, 2013, which claims priority to Japanese Patent Application No. 2012-046472, filed Mar. 2, 2012, the disclosures of each of these applications being incorporated herein by reference in their entireties for all purposes.

FIELD OF THE INVENTION

The present invention relates to a high strength galvanized steel sheet which is preferably used as an automotive corrosion-resistant coated steel sheet and a method for manufacturing the same.

BACKGROUND OF THE INVENTION

A hot-rolled steel sheet having a tensile strength (TS) of 440 MPa grade or lower has been used for members of passenger cars and trucks such as frames and chassis. However, recently, since there has been a trend toward strengthening and thickness reduction of automotive steel sheets in order to increase the collision resistance of automobiles and to protect the global environment, investigations have been started regarding the use of a high strength hot-rolled steel sheet having a TS of 590 MPa grade, a TS of 780 MPa grade or a TS of 980 MPa grade or higher.

Since many automotive members have complicated shapes which are produced by performing press forming, it is necessary that the steel sheets for the members have not only high strength but also excellent formability. On the other hand, in the light of ensuring that automobile bodies have sufficient corrosion resistance while the thickness of the steel sheet is decreased, there is a demand for a coated steel sheet which is manufactured by giving corrosion resistance to a steel sheet, in particular a galvannealed steel sheet which is excellent in terms of corrosion resistance and weldability and can be manufactured at low cost.

In the past, there have been some examples of high strength hot-rolled steel sheets or high strength galvanized steel sheets having excellent formability and methods for manufacturing these steel sheets. For example, Patent Literature 1 discloses a high strength steel sheet having a TS of 590 MPa or more and excellent formability and a method for manufacturing the steel sheet, the method including smelting a steel having a chemical composition consisting of, by mass %, C: 0.02% to 0.06%, Si: 0.3% or less, Mn: 0.5% to 2.0%, P: 0.06% or less, S: 0.005% or less, Al: 0.06% or less, N: 0.006% or less, Mo: 0.05% to 0.5%, Ti: 0.03% to 0.14% and the balance substantively being Fe, and hot-rolling the smelted steel under the conditions that the finishing rolling temperature is 880° C. or higher and the coiling temperature is 570° C. or higher so that the steel sheet has a microstructure substantively being a ferrite single phase in which carbides containing Ti and Mo and having an average grain diameter of less than 10 nm are dispersed.

In addition, Patent Literature 2 discloses a method for manufacturing a galvanized high strength hot-rolled steel sheet, the method including smelting a steel having a chemical composition comprising, by mass %, C: 0.01% to 0.1%, Si: 0.3% or less, Mn: 0.2% to 2.0%, P: 0.04% or less, S: 0.02% or less, Al: 0.1% or less, N: 0.006% or less, Ti: 0.03% to 0.2%, one or more of Mo: 0.5% or less and W: 1.0% or less and the balance being Fe and inevitable impurities, hot-rolling the smelted steel in a temperature range in which an austenite single phase is formed, coiling the hot-rolled steel sheet at a coiling temperature of 550° C. or higher in order to manufacture a hot-rolled steel sheet having a microstructure being a ferrite single phase, performing descaling on the steel sheet and directly performing galvanizing on the descaled steel sheet so that the galvanized steel sheet has a chemical composition in which, by mass %, the relationship $4.8C+4.2Si+0.4Mn+2Ti \leq 2.5$ is satisfied and a microstructure including, in terms of area ratio, 98% or more of a ferrite phase in which precipitates containing one or more of Ti, Mo and W and having a size of less than 10 nm are dispersed, and in terms of atomic ratio, the relationship $(Mo+W)/(Ti+Mo+W)0.2$ is satisfied.

However, in Patent Literatures 1 and 2, since fine carbides containing, for example, Ti and Mo are precipitated in a ferrite phase, it is necessary to perform coiling at a coiling temperature (hereinafter, also referred to as CT) of 550° C. or higher after finishing rolling has been performed. In the case where coiling is performed on a hot-rolled steel sheet containing chemical elements such as Si and Mn which have greater affinities for oxygen than Fe (hereinafter, also referred to as easily oxidized chemical elements) at such a high CT, internal oxides containing easily oxidized chemical elements are formed in the surface portion of the hot-rolled steel sheet. Therefore, since a Zn—Fe alloying reaction excessively progresses in subsequent galvanizing and alloying treatments, there is a problem in that there is a decrease in coating adhesiveness. Moreover, in the case where a large amount of internal oxides are present in the surface portion of the base steel sheet, the internal oxides become the origins of fine cracks which occur in the surface portion of the base steel sheet and in a zinc-coated layer when stretch flange forming is performed. Therefore, there is a problem in that there is a decrease in corrosion resistance of a portion subjected to stretch flange forming.

On the other hand, in the case where coiling is performed at a lower CT in order to prevent internal oxides from being formed, since there is an insufficient amount of carbides precipitated, and since a microstructure such as a pearlite phase grows, there is a decrease in strength and formability. In addition to that, when the hot-rolled steel sheet is subsequently annealed in a continuous galvanizing line, since Ti which is present in the non-precipitated solid solute state is concentrated in the form of oxides on the surface of the base steel sheet, small coating defects and non-uniform alloying unevenness occur after a galvanizing treatment or an alloying treatment has subsequently been performed, which results in a significant deterioration of the surface appearance.

PATENT LITERATURE

PTL 1: Japanese Unexamined Patent Application Publication No. 2002-322543

PTL 2: Japanese Unexamined Patent Application Publication No. 2003-321736

SUMMARY OF THE INVENTION

The present invention has been completed in view of the situation described above, and an object of the present invention is to provide a high strength galvanized steel sheet excellent in terms of coating adhesiveness in a portion subjected to bending forming, corrosion resistance in a portion subjected to stretch flange forming and surface appearance, while good formability is maintained, and a method for manufacturing the high strength galvanized steel sheet.

The present inventors diligently conducted investigations regarding coating treatment of a high strength steel sheet, and as a result, obtained the findings described below.

Firstly, it was found that, by specifying the concentration ratio of C to Ti in the surface portion of a steel sheet, good stretch flange formability is obtained due to solid solute Ti being precipitated in the form of fine carbides and uniform surface appearance is obtained due to a decrease in solid solute Ti concentration. In addition, it was also found that, in order to obtain uniform surface appearance without coating defects or alloying unevenness, it is significantly important to control the concentration of chemical composition of the surface portion of a base steel sheet immediately under a zinc-coated layer, in particular Ti concentration. The reason for this is thought to be that, in the case where a large amount of Ti is present in the non-precipitated solid solute state in the surface portion of a base steel sheet, since Ti, which is a chemical element having a greater affinity for oxygen than Fe, is concentrated in the form of Ti oxides on the surface of the base steel sheet when annealing is performed, there is a decrease in wettability of the base steel sheet with zinc-coating solution, and diffusion of Zn and Fe is suppressed in a Zn—Fe alloying reaction. Moreover, it was found that it is necessary to control internal oxides in the surface portion of a base steel sheet in order to ensure sufficient coating adhesiveness when bending forming is performed and sufficient corrosion resistance of a portion subjected to stretch flange forming.

Regarding a method for manufacturing the high strength galvanized steel sheet, it was found that it is important to control the CT in order to prevent internal oxides from being formed when hot-rolling is performed and that it is important to specify a maximum temperature of a steel sheet when the steel sheet is subsequently annealed in a continuous galvanizing line in order to precipitate solid solute Ti which is present in the surface portion of the steel sheet in the form of carbides. In addition, it was also found that it is significantly important to control water vapor partial pressure ($P_{H2O}$) and hydrogen partial pressure ($P_{H2}$) in an atmosphere of annealing in order to stably precipitate Ti carbides when annealing is performed.

The present invention has been completed on the basis of the findings described above and includes the following aspects.

[1] A high strength galvanized steel sheet, composed of a base steel sheet having a chemical composition comprising, by mass %, C: 0.02% or more and 0.30% or less, Si: 0.01% or more and 2.5% or less, Mn: 0.1% or more and 3.0% or less, P: 0.003% or more and 0.08% or less, S: 0.01% or less, Al: 0.001% or more and 0.20% or less, Ti: 0.03% or more and 0.40% or less and the balance being Fe and inevitable impurities, and a zinc-coated layer on both surfaces of the base steel sheet having a coating weight per surface of 20 $g/m^2$ or more and 120 $g/m^2$ or less, in which the concentration ratio of C to Ti (C/Ti) in a portion within 10 μm from the surface of the base steel sheet immediately under the zinc-coated layer is, in terms of atomic ratio, 0.8 or more and 1.5 or less, and in which the total amount of oxides of one or more selected from Fe, Si, Mn, P, Al and Ti formed in a portion within 100 μm from the surface of the base steel sheet immediately under the zinc-coated layer is, in terms of oxygen amount, 0.05 $g/m^2$ or less per surface.

[2] The high strength galvanized steel sheet according to item [1], wherein a solid solute Ti concentration in a portion within 10 μm from the surface of the base steel sheet immediately under the zinc-coated layer is, by mass %, 0.05% or less.

[3] The high strength galvanized steel sheet according to item [1] or [2], the chemical composition further containing, by mass %, one, two or more selected from Nb: 0.001% or more and 0.2% or less, V: 0.001% or more and 0.5% or less, Mo: 0.01% or more and 0.5% or less and W: 0.001% or more and 0.2% or less.

[4] The high strength galvanized steel sheet according to any one of items [1] to [3], the chemical composition further containing, by mass %, B: 0.0002% or more and 0.005% or less.

[5] The high strength galvanized steel sheet according to any one of items [1] to [4], wherein the base steel sheet is a hot-rolled steel sheet.

[6] A method for manufacturing a high strength galvanized steel sheet, the method including: hot-rolling a steel having the chemical composition according to any one of items [1], [3] and [4]; performing cooling and coiling after finishing rolling has been performed; and subsequently performing continuous annealing and galvanizing treatment, in which, when hot-rolling is performed, the finishing delivery temperature is 850° C. or higher and the CT is 540° C. or lower, in which the temperature of the base steel sheet when continuous annealing is performed is 600° C. or higher, and in which the water vapor partial pressure ($P_{H2O}$) and the hydrogen partial pressure ($P_{H2}$) in the furnace atmosphere when the continuous annealing is performed satisfy expression (1) below:

$$1 \leq \log(P_{H2}/P_{H2O}) \leq 4 \quad (1),$$

where $P_{H2}$ represents hydrogen partial pressure (Pa) and $P_{H2O}$ represents water vapor partial pressure (Pa).

[7] The method for manufacturing a high strength galvanized steel sheet according to item [6], the method further including performing alloying treatment after the galvanizing treatment has been performed by heating the galvanized steel sheet at a temperature of 450° C. or higher and 550° C. or lower such that the Fe content in the zinc-coated layer is in the range of 7% or more and 15% or less.

Here, in the present invention, "high strength" means that the steel sheet has a TS of 590 MPa or more.

According to the present invention, a high strength galvanized steel sheet excellent in terms of coating adhesiveness of a portion subjected to bending forming, corrosion resistance of a portion subjected to stretch flange forming and surface appearance is obtained while good formability can be maintained.

DETAILED DESCRIPTION OF EMBODIMENTS OF THE INVENTION

Hereafter, the present invention will be specifically described with reference to exemplary embodiments. Here, the contents of the chemical elements in the chemical composition of steel will be expressed in units of "mass %" in the description below, and "mass %" will be simply represented by "%" unless otherwise noted.

Hereafter, the present invention will be described in detail with reference to exemplary embodiments.

(1) Composition of Steel Sheet

C: 0.02% or more and 0.30% or less

C is a chemical element which is necessary to precipitate carbides in a steel sheet, and it is necessary that the C content be 0.02% or more in order to realize this effect. On the other hand, in the case where the C content is more than 0.30%, since there is a decrease in weldability, the upper limit of the C content is set to be 0.30%.

Si: 0.01% or more and 2.5% or less

Si is a chemical element which is effective for solid solution strengthening, and it is necessary that the Si content be 0.01% or more in order to realize the strengthening effect. On the other hand, in the case where the Si content is more than 2.5%, since Si oxides are concentrated on the surface of a steel sheet in an annealing process and cause the occurrence of coating defects and a decrease in coating adhesiveness, the upper limit of the Si content is set to be 2.5%.

Mn: 0.1% or more and 3.0% or less

Mn is added in order to increase strength, and it is necessary that the Mn content be 0.1% or more in order to realize the effect of strengthening. On the other hand, in the case where the Mn content is more than 3.0%, since Mn oxides are concentrated on the surface of a steel sheet in an annealing process and cause the occurrence of coating defects and a decrease in coating adhesiveness, the upper limit of the Mn content is set to be 3.0%.

P: 0.003% or more and 0.08% or less

Since P is one of chemical elements which are inevitably contained in steel, and since there is concern that there may be an increase in cost in order to control the P content to be less than 0.003%, the P content is set to be 0.003% or more. On the other hand, in the case where the P content is more than 0.08%, there is a decrease in weldability, and further, there is a deterioration of surface quality. In addition, it is impossible to achieve the desired alloying degree, unless an alloying treatment temperature is increased when alloying treatment is performed. In the case where an alloying treatment temperature is increased in order to achieve the desired alloying degree, there is a decrease not only in ductility but also in adhesiveness of an alloyed coating film. As described above, the P content is set to be 0.08% or less in order to achieve the desired alloying degree, satisfactory ductility and sufficient adhesiveness of an alloyed coating film.

S: 0.01% or less

S is segregated at grain boundaries or causes a decrease in toughness in the case where a large amount of MnS is formed. Therefore, it is necessary that the S content be 0.01% or less. There is no limitation on the lower limit of the S content, and the S content may be almost the same as that of impurities.

Al: 0.001% or more and 0.20% or less

Al is added in order to deoxidize molten steel. In the case where the Al content is less than 0.001%, this purpose is not achieved. On the other hand, in the case where the Al content is more than 0.20%, a large amount of inclusions are formed and these inclusions cause defects in a steel sheet. Therefore, the Al content is set to be 0.001% or more and 0.20% or less.

Ti: 0.03% or more and 0.40% or less

Ti is a chemical element which is necessary in order to increase strength as a result of being precipitated in the steel sheet in the form of carbides and which is effective from an economic viewpoint. However, in the case where the Ti content is less than 0.03%, there is an insufficient amount of precipitates which are necessary to increase strength. In the case where the Ti content is more than 0.40%, this effect becomes saturated and there is an increase in cost. Therefore, the Ti content is set to be 0.03% or more and 0.40% or less.

In addition, for the purposes described below, chemical elements below may be added in addition to the chemical elements described above.

One, two or more selected from Nb: 0.001% or more and 0.2% or less, V: 0.001% or more and 0.5% or less, Mo: 0.01% or more and 0.5% or less and W: 0.001% or more and 0.2% or less Since Nb, V, Mo and W are chemical elements which are effective for stably precipitating fine carbides as a result of being precipitated in the steel sheet in the form of combined carbides containing Ti, one, two or more selected from these chemical elements are added. However, there is an insufficient effect of increasing strength as a result of precipitation in the case where the contents of these chemical elements are less than the contents specified above, and this effect becomes saturated and there is an increase in cost in the case where the contents of these chemical elements are more than the contents specified above.

B: 0.0002% or more and 0.005% or less

Although B is a chemical element which is effective for increasing hardenability, the effect of increasing hardenability cannot be achieved in the case where the B content is less than 0.0002%. On the other hand, in the case where the B is added more than 0.005%, this effect becomes saturated and there is an increase in cost.

Therefore, in the case where B is to be added, the B content is set to be 0.0002% or more and 0.005% or less.

The balance of the chemical composition is Fe and inevitable impurities.

(2) Microstructure in the Surface Portion of a Base Steel Sheet Immediately Under a Zinc-Coated Layer In the case of the high strength galvanized steel sheet according to embodiments of the present invention, it is advantageous that the concentration ratio of C to Ti in a portion within 10 μm from the surface of a base steel sheet immediately under a zinc-coated layer be controlled to be, in terms of atomic ratio, 0.8 or more and 1.5 or less. By controlling the concentration ratio of C to Ti within this range, since fine carbides containing Ti are stably formed in the surface portion of a base steel sheet, satisfactory stretch flange formability is obtained and uniform surface appearance is obtained due to a decrease in solid solute Ti concentration. In the case where the concentration ratio of C to Ti is less than 0.8, since a large amount of non-precipitated solid solute Ti is present in the surface portion of a base steel sheet and concentrated in the form of Ti oxides on the surface of a base steel sheet, coating defects and alloying unevenness occur. In the case where the concentration ratio of C to Ti is more than 1.5, there is a decrease in stretch flange formability due to an increase in the size of carbides.

In addition, it is preferable that the solid solute Ti concentration in a portion within 10 μm from the surface of a base steel sheet immediately under a zinc-coated layer be 0.05% or less. In the case where the solid solute Ti concentration is more than 0.05%, since solid solute Ti is concentrated in the form of Ti oxides on the surface of a base steel sheet, there is a case where coating defects and alloying unevenness occur. In addition, the total amount of oxides (hereinafter, also referred to as internal oxides) of one or more selected from Fe, Si, Mn, P, Al and Ti formed in a surface portion of a base steel sheet within 100 μm from the surface of the base steel sheet immediately under the zinc-coated layer is set to be, in terms of oxygen amount, 0.05 $g/m^2$ or less per surface. In the case where the total amount is more than 0.05 $g/m^2$, since a Zn—Fe alloying reaction excessively progresses in galvanizing and alloying treatments, there is a decrease in coating adhesiveness when bending forming is performed. Moreover, since the internal oxides become the origins of fine cracks which occur in the surface portion of the base steel sheet and in the zinc-coated layer when stretch flange forming is performed, there is a decrease in the corrosion resistance of a portion subjected to stretch flange forming.

Incidentally, the concentration ratio of C to Ti in a portion within 10 μm from the surface of a base steel sheet immediately under the zinc-coated layer can be confirmed with the following method. For example, the cross section of a steel sheet including the coated layer is machined into a thin sample using a focused ion beam machining device (FIB), and then the thin sample is observed using a transmission electron microscope (TEM) and a chemical composition is analyzed using an energy dispersive X-ray spectrometer (EDX).

Examples of a method for determining solid solute Ti concentration in a portion within 10 μm from the surface of a base steel sheet immediately under a zinc-coated layer include a method in which, after a zinc-coated layer has been dissolved and removed, precipitates are extracted by performing electroextraction using a 10% acetylacetone-1% tetramethylammonium chloride-methanol-based electrolytic solution (AA-based electrolytic solution). At this time, the amount of dissolved base steel sheet is calculated from the amount of electricity used for dissolution, while dissolution is performed until a thickness of 10 μm is dissolved. All of the extraction residue obtained as described above is dissolved in order to determine Ti concentration by performing ICP analysis, and then, using the determined Ti concentration C1 in the form of precipitates and the determined Ti concentration C0 contained in a base steel sheet, the difference (C0-C1) between C0 and C1 is calculated and defined as solid solute Ti concentration in the surface portion of a base steel sheet.

The total amount of internal oxides (hereinafter, referred to as internal oxide amount) can be determined using an "impulse furnace melting-infrared absorption method". However, it is necessary that the amount of oxygen contained in the base steel sheet (that is, internal portion of a base steel sheet before an annealing treatment is performed) be subtracted. Therefore, in the present invention, oxygen concentration in steel is determined after polishing both surface portions of a base steel sheet after continuous annealing has been performed to a depth of 100 μm or more and defined the measured value as the amount of oxygen OH contained in a base steel sheet, and oxygen concentration in steel is determined for the entire portion in the thickness direction of a base steel sheet after continuous annealing has been performed and defined the measured value as the amount of oxygen OI after internal oxidation has occurred. Using the amount of oxygen OI of a base steel sheet after internal oxidation has occurred and the amount of oxygen OH of a base steel sheet before internal oxidation has occurred, those are obtained as described above, the difference (=OI−OH) between OI and OH is calculated, and the difference is converted to an amount per unit area (that is, 1 $m^2$) per surface and defined as an internal oxide amount ($g/m^2$).

(3) Method for Manufacturing the High Strength Galvanized Steel Sheet

The high strength galvanized steel sheet according to the present invention is preferably obtained by hot-rolling a steel having the chemical composition described above under the condition of a finishing delivery temperature of 850° C. or higher, cooling and coiling under the condition of a CT of 540° C. or lower in order to obtain a hot-rolled steel sheet, and by subsequently performing continuous annealing and galvanizing under the conditions that the temperature of the steel sheet is 600° C. or higher and the water vapor partial pressure ($P_{H2O}$) and the hydrogen partial pressure ($P_{H2}$) in the furnace atmosphere satisfy expression (1) below:

$$1 \leq \log(P_{H2}/P_{H2O}) \leq 4 \quad (1),$$

where $P_{H2}$ represents hydrogen partial pressure (Pa) and $P_{H2O}$ represents water vapor partial pressure (Pa).

Firstly, hot-rolling conditions will be described.

Finishing delivery temperature: 850° C. or higher

In the case where the finishing delivery temperature is lower than 850° C., there is an increase in the amount of strain accumulated due to rolling under the non-recrystallization state, which results in an increase in rolling load. Therefore, the finishing delivery temperature is set to be 850° C. or higher. Although there is no limitation on the upper limit of the finishing delivery temperature, it is preferable that the finishing delivery temperature be 1100° C. or lower.

CT: 540° C. or lower

The CT is an important factor in the present invention. In the case where the CT is higher than 540° C., since internal oxides of easily oxidized chemical elements are formed, a Zn—Fe alloying reaction excessively progresses in subsequent galvanizing and alloying treatment processes, which results in a deterioration of surface appearance due to the occurrence of alloying unevenness, in a decrease in coating adhesiveness of a portion subjected to bending forming and in a decrease in corrosion resistance of a portion subjected to stretch flange forming. Therefore, the CT is set to be 540° C. or lower.

Subsequently, continuous annealing and galvanizing treatment will be described.

Temperature of steel sheet: 600° C. or higher

The temperature of a steel sheet is an important factor in the present invention. In the case where the temperature of a steel sheet is lower than 600° C., fine carbides are not precipitated in a sufficient amount in the steel sheet, which results in a decrease in strength, and, in addition to that, an oxidized Fe film which is present on the surface of the steel sheet is not reduced, which results in an occurrence of coating defects in the subsequent galvanizing treatment. Although there is no limitation on the upper limit of the temperature, in the case where the temperature is higher than 800° C., there is an increase in size of carbides which are precipitated in the steel sheet, which results in a decrease in strength and formability, and, in addition to that, easily oxidized chemical elements such as Si and Mn are concentrated on the surface of the steel sheet and form oxides, which results in coating defects. Therefore, it is preferable that the upper limit of the temperature of the steel sheet be 800° C. or lower.

Water vapor partial pressure ($P_{H2O}$) and hydrogen partial pressure ($P_{H2}$) in an atmosphere of annealing furnace: $1 \leq \log(P_{H2}/P_{H2O}) \leq 4$ It is significantly important to control water vapor partial pressure and hydrogen partial pressure in an atmosphere of annealing furnace to be within the range described above in order to manufacture the high strength galvanized steel sheet according to the present invention. In the case where $\log(P_{H2}/P_{H2O})$ is less than 1, since C in steel in the surface portion of the steel sheet is released in the form of CO gas due to an increase in oxygen potential in the atmosphere, there is a significant decrease in C/Ti concentration ratio in the surface portion of the steel sheet, which results in an increase in solid solute Ti concentration. Moreover, in the surface portion of the steel sheet, the formation of internal oxides containing, for example, Si, Mn and Ti is promoted by oxygen which is diffused into steel. On the other hand, in the case where $\log(P_{H2}/P_{H2O})$ is more than 4, since the effects of decreasing solid solute Ti concentration and of preventing internal oxidation in the surface portion of a steel sheet become saturated due to oxygen potential in an atmosphere being sufficiently low, and since there is an increase in cost for controlling the atmosphere, the upper limit of $\log(P_{H2}/P_{H2O})$ is, therefore, set to be 4.

There is no limitation on what method is used to determine water vapor partial pressure ($P_{H2O}$) and hydrogen partial pressure ($P_{H2}$). For example, the dew point of a certain amount of gas sampled is determined using a dew point measuring instrument such as Dew Cup, and water vapor partial pressure ($P_{H2O}$) is derived from the dew point. Similarly, $H_2$ concentration is determined using a commercially available $H_2$ concentration meter, and hydrogen partial pressure ($P_{H2}$) is derived from the $H_2$ concentration. For another example, by determining the pressure of the atmosphere, water vapor partial pressure ($P_{H2O}$) and hydrogen partial pressure ($P_{H2}$) are calculated from a concentration ratio.

Moreover, the high strength galvanized steel sheet according to the present invention preferably has a zinc-coated layer having a coating weight of 20 g/m$^2$ or more and 120 g/m$^2$ or less per surface of the steel sheet. It is difficult to achieve sufficient corrosion resistance in the case where the coating weight is less than 20 g/m$^2$, and there is a decrease in coating adhesiveness in the case where the coating weight is more than 120 g/m$^2$.

In addition, the high strength galvanized steel sheet according to the present invention may be made into a galvannealed steel sheet by performing alloying treatment after, galvanizing treatment has been performed. In the case of a galvannealed steel sheet, the Fe content in the zinc-coated layer is set to be 7% or more and 15% or less. In the case where the Fe content is less than 7%, uniform surface appearance cannot be achieved due to the occurrence of alloying unevenness, and, in addition to that, a thick soft ζ phase is formed in the surface portion of the zinc-coated layer due to an insufficient Zn—Fe alloying reaction, which results in an occurrence of flaking in which a zinc-coated layer is avulsed in a scale-like shape when bending forming is performed. On the other hand, in the case where the F content is more than 15%, since a Zn—Fe alloying reaction excessively progresses, a thick brittle F phase is formed in the vicinity of the interface of the zinc-coated layer and the base steel sheet which results in a decrease in coating adhesiveness.

EXAMPLES

By heating slabs having the chemical compositions given in Table 1 at a temperature of 1250° C., by hot-rolling the heated slabs under the conditions given in Table 2, and by performing pickling on the hot-rolled steel sheets in order to remove scales, hot-rolled steel sheets having a thickness of 2.3 mm were obtained.

Subsequently, continuous annealing treatment and galvanizing treatment were performed using a CGL line. Continuous annealing treatment was performed under the conditions regarding water vapor partial pressure ($P_{H2O}$), hydrogen partial pressure ($P_{H2}$) in the atmosphere of annealing furnace and the maximum temperature of a steel sheet given in Table 2. The atmosphere was almost uniform throughout the annealing furnace including a heating zone and a soaking zone. Here, the dew point of the atmosphere was controlled by heating a water tank installed in a $N_2$ gas line in order to humidify $N_2$ gas, by feeding $H_2$ gas into the humidified $N_2$ gas flowing through a pipe line installed in advance in order to feed the humidified $N_2$ gas so that the $N_2$ gas and the $H_2$ gas were mixed and by feeding the mixed gas into the annealing furnace. In addition, $H_2$ concentration in the atmosphere was controlled by adjusting the amount of $H_2$ gas fed into the humidified $N_2$ gas using a gas valve.

Subsequently, galvanizing treatment was performed by dipping the annealed steel sheet in a Zn bath containing Al having a bath temperature of 460° C. At that time, coating weight per surface was controlled to be 45 g/m$^2$, 70 g/m$^2$ or 140 g/m$^2$ using a gas wiping method. In the case of a galvannealed steel sheet, alloying treatment was performed after galvanizing treatment had been performed.

TABLE 1

| Steel No. | C | Si | Mn | P | S | Al | Ti | Nb | V | Mo | W | B | Note |
|---|---|---|---|---|---|---|---|---|---|---|---|---|---|
| A | 0.03 | 0.05 | 0.9 | 0.005 | 0.001 | 0.005 | 0.05 | 0.02 | 0 | 0 | 0 | 0 | Example |
| B | 0.05 | 0.05 | 1.2 | 0.005 | 0.001 | 0.005 | 0.08 | 0.05 | 0 | 0 | 0 | 0 | Example |
| C | 0.10 | 0.05 | 1.7 | 0.005 | 0.001 | 0.005 | 0.12 | 0.19 | 0 | 0 | 0 | 0 | Example |
| D | 0.06 | 0.05 | 1.2 | 0.005 | 0.001 | 0.005 | 0.10 | 0 | 0.08 | 0 | 0 | 0 | Example |
| E | 0.09 | 0.05 | 1.7 | 0.005 | 0.001 | 0.005 | 0.15 | 0 | 0.24 | 0 | 0 | 0 | Example |
| F | 0.15 | 0.05 | 1.5 | 0.005 | 0.001 | 0.005 | 0.11 | 0 | 0.48 | 0 | 0 | 0 | Example |
| G | 0.04 | 0.05 | 0.6 | 0.005 | 0.001 | 0.005 | 0.09 | 0 | 0 | 0.10 | 0 | 0 | Example |
| H | 0.06 | 0.05 | 1.2 | 0.005 | 0.001 | 0.005 | 0.10 | 0 | 0 | 0.21 | 0 | 0 | Example |
| I | 0.10 | 0.05 | 1.1 | 0.005 | 0.001 | 0.005 | 0.15 | 0 | 0 | 0.40 | 0 | 0 | Example |
| J | 0.04 | 0.05 | 1.0 | 0.005 | 0.001 | 0.005 | 0.13 | 0 | 0 | 0 | 0.02 | 0 | Example |
| K | 0.09 | 0.05 | 1.3 | 0.005 | 0.001 | 0.005 | 0.18 | 0 | 0 | 0 | 0.09 | 0 | Example |
| L | 0.11 | 0.05 | 1.4 | 0.005 | 0.001 | 0.005 | 0.19 | 0 | 0 | 0 | 0.16 | 0 | Example |
| M | 0.03 | 0.05 | 0.7 | 0.005 | 0.001 | 0.005 | 0.02 | 0 | 0 | 0 | 0 | 0 | Comparative Example |
| N | 0.03 | 0.05 | 0.7 | 0.005 | 0.001 | 0.005 | 0.04 | 0 | 0 | 0 | 0 | 0 | Example |
| O | 0.03 | 0.05 | 0.6 | 0.005 | 0.001 | 0.005 | 0.07 | 0 | 0 | 0 | 0 | 0.001 | Example |
| P | 0.03 | 0.05 | 0.6 | 0.005 | 0.001 | 0.005 | 0.07 | 0 | 0 | 0 | 0 | 0.002 | Example |
| Q | 0.03 | 0.05 | 0.6 | 0.005 | 0.001 | 0.005 | 0.07 | 0 | 0 | 0 | 0 | 0.004 | Example |
| R | 0.04 | 0.05 | 0.1 | 0.005 | 0.001 | 0.005 | 0.10 | 0 | 0 | 0 | 0 | 0.002 | Example |
| S | 0.03 | 0.05 | 0.2 | 0.005 | 0.001 | 0.005 | 0.08 | 0 | 0 | 0 | 0 | 0.003 | Example |
| T | 0.05 | 0.05 | 0.3 | 0.005 | 0.001 | 0.005 | 0.12 | 0 | 0 | 0 | 0 | 0.002 | Example |
| U | 0.09 | 0.05 | 0.4 | 0.005 | 0.001 | 0.005 | 0.14 | 0 | 0.1 | 0 | 0 | 0.002 | Example |
| V | 0.08 | 0.05 | 1.4 | 0.005 | 0.001 | 0.005 | 0.21 | 0 | 0 | 0 | 0 | 0 | Example |
| W | 0.13 | 0.05 | 1.7 | 0.005 | 0.001 | 0.005 | 0.38 | 0 | 0 | 0 | 0 | 0 | Example |
| X | 0.01 | 0.05 | 0.7 | 0.005 | 0.001 | 0.005 | 0.07 | 0 | 0.11 | 0 | 0 | 0 | Comparative Example |

TABLE 1-continued

| Steel No. | C | Si | Mn | P | S | Al | Ti | Nb | V | Mo | W | B | Note |
|---|---|---|---|---|---|---|---|---|---|---|---|---|---|
| Y | 0.02 | 0.05 | 0.9 | 0.005 | 0.001 | 0.005 | 0.05 | 0.01 | 0 | 0.05 | 0 | 0 | Example |
| Z | 0.16 | 0.05 | 1.4 | 0.005 | 0.001 | 0.005 | 0.15 | 0.05 | 0 | 0.15 | 0 | 0 | Example |
| AA | 0.28 | 0.05 | 1.7 | 0.005 | 0.001 | 0.005 | 0.35 | 0.10 | 0 | 0.30 | 0 | 0 | Example |
| AB | 0.07 | 0.40 | 0.7 | 0.005 | 0.001 | 0.005 | 0.15 | 0 | 0.15 | 0 | 0 | 0 | Example |
| AC | 0.07 | 0.70 | 2.0 | 0.005 | 0.001 | 0.005 | 0.15 | 0 | 0.15 | 0 | 0 | 0 | Example |
| AD | 0.07 | 0.70 | 2.9 | 0.005 | 0.001 | 0.005 | 0.15 | 0 | 0.15 | 0 | 0 | 0 | Example |
| AE | 0.07 | 0.70 | 3.1 | 0.005 | 0.001 | 0.005 | 0.15 | 0 | 0.15 | 0 | 0 | 0 | Comparative Example |
| AF | 0.07 | 1.40 | 1.5 | 0.005 | 0.001 | 0.005 | 0.15 | 0 | 0.15 | 0 | 0 | 0 | Example |
| AG | 0.07 | 2.40 | 1.5 | 0.005 | 0.001 | 0.005 | 0.15 | 0 | 0.15 | 0 | 0 | 0 | Example |
| AH | 0.07 | 2.60 | 1.5 | 0.005 | 0.001 | 0.005 | 0.15 | 0 | 0.15 | 0 | 0 | 0 | Comparative Example |

The appearance quality (surface appearance of a zinc-coated layer), formability, coating adhesiveness of a portion subjected to bending forming and corrosion resistance of a portion subjected to stretch flange forming of the obtained galvanized steel sheets (GI) and the obtained galvannealed steel sheets (GA) were investigated. In addition, the concentration ratio of C to Ti (C/Ti) and solid solute Ti concentration in a portion within 10 μm from the surface of a base steel sheet immediately under a zinc-coated layer and internal oxide amount were determined. Determination methods and evaluation criteria will be described below.

<Appearance Quality>

A case where there was no surface appearance defect such as coating defects or alloying unevenness was evaluated as satisfactory (◯), and a case where there was a surface appearance defect was evaluated as unsatisfactory (x).

<Formability>

A tensile test was carried out in accordance with JIS Z 2241 using a JIS No. 5 tensile test piece which was cut out from a galvanized or galvannealed steel sheet in a direction at a right angle to the rolling direction under the condition of a constant crosshead speed of 10 mm/min in order to determine TS (MPa) and elongation (El (%)), and a case where $TS\times El\geq 15000$ was evaluated as satisfactory and a case where $TS\times El<15000$ was evaluated as unsatisfactory.

In addition, a test piece was prepared by cutting out a sample of 130 mm square from a galvanized or galvannealed steel sheet, by punching a hole having a diameter of 10 mmϕ in the center of the cut sample with a clearance of 12.5%, and the punched hole was penetrated upward from the opposite side of burrs using a 60° conical punch, and then the diameter d of the penetrated hole was determined when a crack penetrated the galvanized or galvannealed steel sheet in order to calculate a hole expansion ratio λ using the following equation:

$$\lambda(\%)=[(d-10)/10]\times 100.$$

In evaluation of the hole expansion property, in the case of a sample having a TS of 590 MPa or more and 650 MPa or less, a case where $\lambda\geq 100\%$ was evaluated as satisfactory; in the case of a sample having a TS of 780 MPa or more and 850 MPa or less, a case where $\lambda\geq 60\%$ was evaluated as satisfactory; and in the case of a sample having a TS of 980 MPa or more, a case where $\lambda\geq 30\%$ was evaluated as satisfactory.

<Coating Adhesiveness of a Portion Subjected to Bending Forming>

In order to evaluate the coating adhesiveness of a galvanized steel sheet which was not subjected to an alloying treatment, a tape peeling test was performed on the outside portion of the steel sheet which had been bent at a 180° angle, and it was evaluated using a visual test whether or not there was peeling of the zinc-coated layer.

◯: without peeling of a zinc-coated layer x: with peeling Of a zinc-coated layer In addition, in order to evaluate the coating adhesiveness of a galvannealed steel sheet was evaluated by performing a powdering test as described below.

An adhesive tape was stuck to the steel sheet, and the tape-stuck surface was subjected to a 90° bending-unbending test under the conditions that the stuck surface was on the inside of the bending curvature and the curvature radius was 5 mm, and then the peeled tape was analyzed using fluorescent X-rays. Zn count number per unit length which was determined in this analysis was defined as the amount of peeled coated layer. On the basis of the amount of peeled coated layer determined by performing the powdering test described above, the steel sheet was classified with respect to powdering resistance in accordance with the criteria described below, and a case corresponding to rank 1 was evaluated as excellent (⊙), a case corresponding to rank 2 was evaluated as good (◯) and a case corresponding to rank 3 was evaluated as poor (x). ⊙ and ◯ represent satisfactory cases.

Amount of peeled coated layer: rank 0 or more and less than 3000: 1 (excellent (⊙))

3000 or more and less than 6000: 2 (good (◯))

6000 or more: 3 (poor (x))

<Corrosion Resistance of a Portion Subjected to Stretch Flange Forming>

Test pieces were prepared by cutting out samples of 130 mm square from steel sheets, punching a hole having a diameter of 10 mmϕ in the center of the respective pieces using a punch with a clearance of 12.5%, and the punched hole was penetrated upward from the opposite side of burrs using a 60° conical punch in order to expand the punched hole. The penetration by the punch was conducted such that the hole expansion ratio reached 80% at which a crack may occur. Both surfaces of the portion of the test piece processed as described above was sealed with tapes, and a salt spray test according to JIS Z 2371 (2000) was carried out for ten days, and then the corrosion product was removed by washing for one minute using chromic acid (a concentration of 200 g/L, 80° C.) in order to determine corrosion weight loss per surface ($g/m^2\cdot day$) from the difference between the weight before and after the salt spray test. Corrosion resistance was evaluated with the criteria described below.

good (◯): less than 20 $g/m^2\cdot day$ bad (x):20 $g/m^2\cdot day$ or more

<Concentration Ratio of C to Ti (C/Ti) in a Portion within 10 μm from the Surface of a Base Steel Sheet Immediately Under a Zinc-Coated Layer>

After a zinc-coated layer had been dissolved and removed, the cross section of the base steel sheet was observed using a SEM in order to determine the concentrations of C and Ti in the surface portion of the base steel sheet using EDX and EELS. The observation was performed at a magnification of 5000 to 20000 times at 5 points for each sample, and the average value of the concentrations for the 5 points was defined as the concentration for the sample.

<Solid Solute Ti Concentration in a Portion within 10 μm from the Surface of a Base Steel Sheet Immediately Under a Zinc-Coated Layer>

After a zinc-coated layer had been dissolved and removed, precipitates were extracted by performing electro-extraction using a 10% acetylacetone-1% tetramethylammonium chloride-methanol-based electrolytic solution (AA-based electrolytic solution). At this time, the amount of dissolved base steel sheet was calculated from quantity of electricity used for dissolution, while dissolution was performed until a thickness of 10 μm is dissolved. Ti concentration determined by dissolving all amount of the obtained extraction residue and by performing. ICP analysis was defined as the Ti concentration C1 in the form of precipitates. Using the Ti concentration C1 in the form of precipitates obtained as described above and the Ti concentration C0 contained in a base steel sheet, the difference (C0-C1) between C0 and C1 was calculated and defined as solid solute Ti concentration in the surface portion of a base steel sheet.

<Internal Oxide Amount>

Internal oxide amount was determined using an "impulse furnace melting-infrared absorption method". However, it was necessary that the amount of oxygen contained in the base steel sheet (that is, internal portion of a base steel sheet before an annealing treatment was performed) be subtracted. Therefore, in the present invention, oxygen concentration in steel was determined after polishing both surface portions of a base steel sheet after continuous annealing had been performed to a depth of 100 μm or more and defined as the amount of oxygen OH contained in a base steel sheet, and oxygen concentration in steel was determined for the whole portion in the thickness direction of a base steel sheet after continuous annealing had been performed and defined as the amount of oxygen OI after internal oxidation had occurred. Using the amount of oxygen OI of a base steel sheet obtained as described above after internal oxidation had occurred and the amount of oxygen OH of a base steel sheet, the difference (=OI−OH) of OI and OH was calculated, and the difference was converted to an amount per unit area (that is, 1 $m^2$) per surface and defined as an internal oxide amount ($g/m^2$).

The results obtained as described above are given in Table 2 in addition to the manufacturing conditions.

TABLE 2

| | | Hot-Rolling Condition | | CGL Condition | | Zinc-Coating Layer Property | | | Property of Surface Portion of Base Sheet Immediately under Coating Layer | | |
|---|---|---|---|---|---|---|---|---|---|---|---|
| Sample No. | Steel No. | Finishing Delivery Temperature (° C.) | Coiling Temper-ature (° C.) | Steel Sheet Temper-ature (° C.) | log ($PH_2/PH_2O$) | Kind of Coating | Coating Weight ($g/m^2$) | Fe Content in Coating Layer (mass %) | Concentration Ratio of C to Ti in Portion within 10 · m from Surface of Base Steel Sheet Immediately under Zinc-Coating Layer (C/Ti) | Solid Solute Ti Concentration in Portion within 10 · m from Surface of Base Steel Sheet Immediately under Zinc-Coating Layer (mass) | Internal Oxides Amount in Portion within 100 · m from Surface of Base Steel Sheet Immediately under Zinc-Coating Layer ($g/m^2$) |
| 1 | A | 910 | 500 | 700 | 2.8 | GA | 45 | 11.4 | 1.4 | 0.01 | 0.01 |
| 2 | B | 910 | 500 | 700 | 2.9 | GA | 45 | 10.5 | 1.3 | 0.01 | 0.02 |
| 3 | C | 900 | 490 | 700 | 2.8 | GA | 45 | 10.2 | 1.3 | 0.02 | 0.04 |
| 4 | D | 920 | 510 | 700 | 2.9 | GA | 45 | 11.1 | 1.1 | 0.02 | 0.01 |
| 5 | E | 920 | 500 | 700 | 2.7 | GA | 45 | 11.0 | 1.0 | 0.01 | 0.02 |
| 6 | E | 920 | 520 | 700 | 2.8 | GA | 45 | 8.0 | 1.0 | 0.02 | 0.02 |
| 7 | E | 920 | 520 | 700 | 2.8 | GA | 45 | 14.2 | 1.0 | 0.02 | 0.02 |
| 8 | E | 900 | 480 | 700 | 2.4 | GA | 45 | 11.3 | 0.9 | 0.03 | 0 |
| 9 | E | 910 | 530 | 700 | 2.4 | GA | 45 | 12.8 | 1.0 | 0.02 | 0.04 |
| 10 | E | 900 | 560 | 700 | 2.5 | GA | 45 | 13.9 | 1.2 | 0.01 | 0.06 |
| 11 | E | 850 | 500 | 700 | 2.5 | GA | 45 | 11.4 | 1.0 | 0.02 | 0.01 |
| 12 | E | 1050 | 530 | 700 | 2.7 | GA | 45 | 10.9 | 1.1 | 0.02 | 0.02 |
| 13 | E | 910 | 510 | 700 | 2.4 | GA | 70 | 11.1 | 1.0 | 0.02 | 0.02 |
| 14 | E | 910 | 510 | 700 | 2.4 | GA | 140 | 10.0 | 1.0 | 0.02 | 0.02 |
| 15 | E | 925 | 510 | 550 | 2.6 | GA | 45 | 10.4 | 0.7 | 0.08 | 0.01 |
| 16 | E | 925 | 510 | 600 | 2.8 | GA | 45 | 11.2 | 0.9 | 0.04 | 0.01 |
| 17 | E | 925 | 510 | 790 | 2.8 | GA | 45 | 11.5 | 1.1 | 0.03 | 0 |
| 18 | E | 925 | 520 | 700 | 3.8 | GA | 45 | 11.0 | 1.1 | 0.01 | 0.01 |
| 19 | E | 925 | 520 | 700 | 3 | GA | 45 | 11.4 | 1.0 | 0.02 | 0..02 |
| 20 | E | 925 | 520 | 700 | 2.1 | GA | 45 | 11.1 | 1.1 | 0.02 | 0.02 |
| 21 | E | 925 | 520 | 700 | 1.6 | GA | 45 | 11.9 | 0.8 | 0.04 | 0.04 |
| 22 | E | 925 | 520 | 700 | 1.2 | GA | 45 | 12.8 | 0.8 | 0.05 | 0.05 |
| 23 | E | 925 | 520 | 700 | 0.9 | GA | 45 | 13.1 | 0.6 | 0.09 | 0.08 |
| 24 | E | 920 | 510 | 700 | 2.4 | GI | 45 | — | 1.0 | 0.02 | 0.01 |
| 25 | E | 920 | 510 | 700 | 2.4 | GI | 70 | — | 1.0 | 0.02 | 0.02 |
| 26 | E | 920 | 510 | 700 | 2.4 | GI | 140 | — | 1.0 | 0.02 | 0.02 |
| 27 | F | 940 | 490 | 670 | 2.6 | GA | 45 | 11.0 | 0.9 | 0.03 | 0.03 |
| 28 | G | 940 | 520 | 700 | 2.4 | GA | 45 | 11.3 | 0.8 | 0.02 | 0.01 |
| 29 | H | 940 | 520 | 700 | 2.4 | GA | 45 | 10.5 | 0.9 | 0.03 | 0.01 |
| 30 | I | 950 | 500 | 670 | 2.8 | GA | 45 | 10.7 | 0.8 | 0.03 | 0.01 |
| 31 | J | 970 | 490 | 700 | 2.7 | GA | 45 | 10.1 | 1.2 | 0.03 | 0 |
| 32 | K | 980 | 490 | 700 | 2.7 | GA | 45 | 11.0 | 1.0 | 0.04 | 0 |
| 33 | L | 980 | 490 | 700 | 2.4 | GA | 45 | 10.9 | 1.0 | 0.03 | 0.01 |
| 34 | M | 950 | 500 | 700 | 2.6 | GA | 45 | 11.5 | 1.8 | 0.01 | 0.02 |
| 35 | N | 950 | 500 | 700 | 2.7 | GA | 45 | 12.4 | 1.5 | 0.02 | 0 |
| 36 | O | 950 | 500 | 700 | 2.7 | GA | 45 | 11.0 | 1.0 | 0.03 | 0 |
| 37 | P | 950 | 500 | 700 | 2.6 | GA | 45 | 10.7 | 1.1 | 0..03 | 0.01 |
| 38 | Q | 950 | 500 | 700 | 2.6 | GA | 45 | 10.9 | 1.0 | 0.02 | 0.02 |
| 39 | R | 930 | 520 | 740 | 3.7 | GA | 45 | 11.0 | 1.0 | 0.03 | 0.02 |
| 40 | R | 930 | 520 | 740 | 2.1 | GA | 45 | 10.8 | 0.9 | 0.02 | 0.01 |
| 41 | R | 930 | 520 | 740 | 1.4 | GA | 45 | 11.0 | 0.8 | 0.04 | 0.04 |
| 42 | R | 930 | 520 | 740 | 0.8 | GA | 45 | 12.4 | 0.7 | 0.06 | 0.07 |
| 43 | R | 930 | 540 | 740 | 2.6 | GA | 45 | 11.4 | 1.0 | 0.03 | 0.03 |
| 44 | R | 930 | 580 | 740 | 2.5 | GA | 45 | 12.7 | 0.9 | 0.02 | 0.06 |

TABLE 2-continued

| | | | | | | | | | | | |
|---|---|---|---|---|---|---|---|---|---|---|---|
| 45 | R | 930 | 520 | 750 | 2.6 | GI | 45 | — | 1.0 | 0.03 | 0.01 |
| 46 | R | 930 | 520 | 750 | 2.4 | GI | 70 | — | 0.9 | 0.03 | 0.01 |
| 47 | R | 930 | 520 | 750 | 2.3 | GI | 140 | — | 0.9 | 0.03 | 0.01 |
| 48 | S | 935 | 510 | 750 | 2.8 | GA | 45 | 11.3 | 1.0 | 0.02 | 0.02 |
| 49 | T | 935 | 500 | 745 | 2.8 | GA | 45 | 11.1 | 1.2 | 0.03 | 0.02 |
| 50 | U | 940 | 520 | 750 | 2.7 | GA | 45 | 12.0 | 1.1 | 0.02 | 0.02 |
| 51 | V | 940 | 490 | 680 | 2.8 | GA | 45 | 11.5 | 1.0 | 0.04 | 0.03 |
| 52 | W | 940 | 480 | 690 | 2.6 | GA | 45 | 10.7 | 1.2 | 0.04 | 0.04 |
| 53 | X | 940 | 490 | 700 | 2.7 | GA | 45 | 10.4 | 0.4 | 0.06 | 0.01 |
| 54 | Y | 970 | 470 | 690 | 2.8 | GA | 45 | 11.5 | 0.8 | 0.02 | 0.01 |
| 55 | Z | 970 | 490 | 690 | 2.7 | GA | 45 | 11.9 | 1.1 | 0.03 | 0.01 |
| 56 | AA | 970 | 500 | 670 | 2.9 | GA | 45 | 11.6 | 1.3 | 0.05 | 0.03 |
| 57 | AB | 950 | 500 | 690 | 2.5 | GA | 45 | 11.6 | 1.2 | 0.03 | 0.02 |
| 58 | AC | 950 | 470 | 650 | 2.7 | GA | 45 | 11.4 | 1.2 | 0.03 | 0.02 |
| 59 | AD | 950 | 460 | 650 | 2.6 | GA | 45 | 10.7 | 1.1 | 0.03 | 0.05 |
| 60 | AE | 950 | 460 | 650 | 2.7 | GA | 45 | 11.6 | 1.1 | 0.03 | 0.05 |
| 61 | AF | 950 | 460 | 640 | 2.9 | GA | 45 | 11.6 | 1.0 | 0.02 | 0.02 |
| 62 | AG | 950 | 460 | 640 | 2.6 | GA | 45 | 11.0 | 1.1 | 0.03 | 0.04 |
| 63 | AH | 950 | 460 | 640 | 2.7 | GA | 45 | 10.2 | 1.0 | 0.02 | 0.05 |

| | Evaluation Results | | | | | | | |
|---|---|---|---|---|---|---|---|---|
| Sample No. | Appearance Quality | TS (MPA) | EL (%) | TS × EL | λ (%) | Coating Adhesiveness in Portion Subjected to Bending Forming | Corrosion Resistance in Portion Subjected to Stretch Flange Forming | Note |
| 1 | ○ | 630 | 29 | 18270 | 112 | ◎ | ○ | Example |
| 2 | ○ | 800 | 21 | 16800 | 75 | ◎ | ○ | Example |
| 3 | ○ | 1010 | 15 | 15150 | 32 | ◎ | ○ | Example |
| 4 | ○ | 830 | 20 | 16600 | 74 | ◎ | ○ | Example |
| 5 | ○ | 1040 | 17 | 17680 | 30 | ◎ | ○ | Example |
| 6 | ○ | 1020 | 18 | 18360 | 33 | ◎ | ○ | Example |
| 7 | ○ | 1010 | 18 | 18180 | 35 | ○ | ○ | Example |
| 8 | ○ | 990 | 18 | 17820 | 33 | ◎ | ○ | Example |
| 9 | ○ | 1030 | 16 | 16480 | 34 | ◎ | ○ | Example |
| 10 | X | 990 | 16 | 15840 | 33 | X | X | Comparative Example |
| 11 | ○ | 990 | 16 | 15840 | 30 | ◎ | ○ | Example |
| 12 | ○ | 1000 | 18 | 18000 | 30 | ◎ | ○ | Example |
| 13 | ○ | 1020 | 17 | 17340 | 32 | ◎ | ○ | Example |
| 14 | ○ | 1020 | 17 | 17340 | 32 | X | ○ | Comparative Example |
| 15 | X | 974 | 15 | 14610 | 21 | ○ | ○ | Comparative Example |
| 16 | ○ | 1010 | 18 | 18180 | 30 | ◎ | ○ | Example |
| 17 | ○ | 990 | 19 | 18810 | 32 | ◎ | ○ | Example |
| 18 | ○ | 1030 | 18 | 18540 | 34 | ◎ | ○ | Example |
| 19 | ○ | 1030 | 17 | 17510 | 32 | ◎ | ○ | Example |
| 20 | ○ | 1020 | 18 | 18360 | 32 | ◎ | ○ | Example |
| 21 | ○ | 1030 | 18 | 18540 | 33 | ◎ | ○ | Example |
| 22 | ○ | 1020 | 17 | 17340 | 27 | ◎ | ○ | Example |
| 23 | X | 1000 | 18 | 18000 | 28 | X | X | Comparative Example |
| 24 | ○ | 1030 | 19 | 19570 | 33 | ○ | ○ | Example |
| 25 | ○ | 1030 | 18 | 18540 | 33 | ○ | ○ | Example |
| 26 | ○ | 1030 | 18 | 18540 | 32 | X | ○ | Comparative Example |
| 27 | ○ | 1070 | 16 | 17120 | 34 | ◎ | ○ | Example |

TABLE 2-continued

| | | | | | | | | |
|---|---|---|---|---|---|---|---|---|
| 28 | ○ | 620 | 32 | 19840 | 115 | ◎ | ○ | Example |
| 29 | ○ | 820 | 23 | 18860 | 87 | ◎ | ○ | Example |
| 30 | ○ | 1050 | 17 | 17850 | 30 | ◎ | ○ | Example |
| 31 | ○ | 630 | 29 | 18270 | 107 | ◎ | ○ | Example |
| 32 | ○ | 810 | 21 | 17010 | 86 | ◎ | ○ | Example |
| 33 | ○ | 1020 | 15 | 15300 | 31 | ◎ | ○ | Example |
| 34 | ○ | 500 | 28 | 14000 | 107 | ◎ | ○ | Comparative Example |
| 35 | ○ | 590 | 28 | 16520 | 120 | ◎ | ○ | Example |
| 36 | ○ | 620 | 29 | 17980 | 101 | ◎ | ○ | Example |
| 37 | ○ | 620 | 29 | 17980 | 121 | ◎ | ○ | Example |
| 38 | ○ | 620 | 29 | 17980 | 115 | ◎ | ○ | Example |
| 39 | ○ | 630 | 30 | 18900 | 100 | ◎ | ○ | Example |
| 40 | ○ | 620 | 29 | 17980 | 104 | ◎ | ○ | Example |
| 41 | ○ | 630 | 29 | 18270 | 101 | ◎ | ○ | Example |
| 42 | X | 610 | 30 | 18300 | 94 | X | X | Comparative Example |
| 43 | ○ | 620 | 30 | 18600 | 108 | ◎ | ○ | Example |
| 44 | X | 590 | 33 | 19470 | 97 | X | X | Comparative Example |
| 45 | ○ | 620 | 31 | 19220 | 105 | ○ | ○ | Example |
| 46 | ○ | 620 | 31 | 19220 | 110 | ○ | ○ | Example |
| 47 | ○ | 620 | 32 | 19840 | 111 | X | ○ | Comparative Example |
| 48 | ○ | 620 | 30 | 18600 | 121 | ◎ | | Example |
| 49 | ○ | 810 | 21 | 17010 | 87 | ◎ | ○ | Example |
| 50 | ○ | 1020 | 16 | 16320 | 36 | ◎ | ○ | Example |
| 51 | ○ | 730 | 22 | 16060 | 79 | ◎ | ○ | Example |
| 52 | ○ | 1000 | 16 | 16000 | 33 | ◎ | ○ | Example |
| 53 | X | 460 | 30 | 13800 | 113 | ◎ | ○ | Comparative Example |
| 54 | ○ | 610 | 30 | 18300 | 130 | ◎ | ○ | Example |
| 55 | ○ | 1050 | 15 | 15750 | 31 | ◎ | ○ | Example |
| 56 | ○ | 1170 | 13 | 15210 | 30 | ◎ | ○ | Example |
| 57 | ○ | 810 | 21 | 17010 | 68 | ◎ | ○ | Example |
| 58 | ○ | 1030 | 15 | 15450 | 31 | ◎ | ○ | Example |
| 59 | ○ | 1230 | 13 | 15990 | 33 | ◎ | ○ | Example |
| 60 | X | 1220 | 13 | 15860 | 34 | X | ○ | Comparative Example |
| 61 | ○ | 1050 | 18 | 18900 | 32 | ◎ | ○ | Example |
| 62 | ○ | 1080 | 16 | 17280 | 33 | ◎ | ○ | Example |
| 63 | X | 1090 | 16 | 17440 | 33 | X | ○ | Comparative Example |

Table 2 indicates that the examples of the present invention were good (○) in terms of all of appearance quality, formability, the coating adhesiveness of a portion subjected to bending forming and corrosion resistance of a portion subjected to stretch flange forming. On the other hand, the comparative examples which do not fall within the range according to the present invention were poor in terms of any of the evaluated properties.

The invention claimed is:

1. A high strength galvanized steel sheet, composed of a steel sheet having a chemical composition comprising, by mass %, C: 0.02% or more and 0.30% or less, Si: 0.01% or more and 2.5% or less, Mn: 0.1% or more and 3.0% or less, P: 0.003% or more and 0.08% or less, S: 0.01% or less, Al: 0.001% or more and 0.20% or less, Ti: 0.03% or more and 0.40% or less and the balance being Fe and inevitable impurities, the steel sheet comprising a base steel sheet which is a hot-rolled steel sheet and a zinc-coated layer on both surfaces of the base steel sheet, the zinc-coated layer having a coating weight per surface of 20 g/m$^2$ or more and 120 g/m$^2$ or less, wherein the concentration ratio of C to Ti (C/Ti) in a portion within 10 μm from the surface of the base steel sheet immediately under the zinc-coated layer is, in terms of atomic ratio, 0.8 or more and 1.5 or less, wherein the total amount of oxides of one or more selected from Fe, Si, Mn, P, Al and Ti formed in a portion within 100 μm from the surface of the base steel sheet immediately under the zinc-coated layer is, in terms of oxygen amount, 0.05 g/m$^2$ or less per side, and wherein a solid solution Ti concentration in a portion within 10 μm from the surface of the base steel sheet immediately under zinc-coated layer is, by mass %, 0.05% or less.

2. The high strength galvanized steel sheet according to claim 1, the chemical composition further containing, by mass %, one, two or more selected from Nb: 0.001% or more and 0.2% or less, V: 0.001% or more and 0.5% or less, Mo: 0.01% or more and 0.5% or less and W: 0.001% or more and 0.2% or less.

3. The high strength galvanized steel sheet according to claim 1, the chemical composition further containing, by mass %, B: 0.0002% or more and 0.005% or less.

4. The high strength galvanized steel sheet according to claim 2, the chemical composition further containing, by mass %, B: 0.0002% or more and 0.005% or less.

5. The high strength galvanized steel sheet according to claim 1, the chemical composition further containing, by mass %, W: 0.001% or more and 0.2% or less.

6. A method for manufacturing a high strength galvanized steel sheet, the method comprising: hot-rolling a steel having the chemical composition according to claim 1; performing cooling and coiling after finishing rolling has been performed; and subsequently performing continuous annealing and galvanizing treatment, wherein, when hot-rolling is performed, the finishing delivery temperature is 850° C. or higher and the coiling temperature is 540° C. or lower, in which the temperature of the base steel sheet when continuous annealing is performed is 600° C. or higher, and wherein the water vapor partial pressure ($P_{H2O}$) and the hydrogen partial pressure ($P_{H2}$) in the furnace atmosphere when the continuous annealing is performed satisfy expression (1) below:

$$1 \leq \log(P_{H2}/P_{H2O}) \leq 4 \quad (1),$$

where $P_{H2}$ represents hydrogen partial pressure (Pa) and $P_{H2O}$ represents water vapor partial pressure (Pa).

7. The method for manufacturing a high strength galvanized steel sheet according to claim 6, the method further comprising performing alloying treatment after the galvanizing treatment has been performed by heating the galvanized steel sheet at a temperature of 450° C. or higher and 550° C. or lower such that the Fe content in the zinc-coated layer is in the range of 7% or more and 15% or less.

8. A method for manufacturing a high strength galvanized steel sheet, the method comprising: hot-rolling a steel having the chemical composition according to claim 2; performing cooling and coiling after finishing rolling has been performed; and subsequently performing continuous annealing and galvanizing treatment, wherein, when hot-rolling is performed, the finishing delivery temperature is 850° C. or higher and the coiling temperature is 540° C. or lower, in which the temperature of the base steel sheet when continuous annealing is performed is 600° C. or higher, and wherein the water vapor partial pressure ($P_{H2O}$) and the hydrogen partial pressure ($P_{H2}$) in the furnace atmosphere when the continuous annealing is performed satisfy expression (1) below:

$$1 \leq \log(P_{H2}/P_{H2O}) \leq 4 \quad (1),$$

where $P_{H2}$ represents hydrogen partial pressure (Pa) and $P_{H2O}$ represents water vapor partial pressure (Pa).

9. A method for manufacturing a high strength galvanized steel sheet, the method comprising: hot-rolling a steel having the chemical composition according to claim 3; performing cooling and coiling after finishing rolling has been performed; and subsequently performing continuous annealing and galvanizing treatment, wherein, when hot-rolling is performed, the finishing delivery temperature is 850° C. or higher and the coiling temperature is 540° C. or lower, in which the temperature of the base steel sheet when continuous annealing is performed is 600° C. or higher, and wherein the water vapor partial pressure ($P_{H2O}$) and the hydrogen partial pressure ($P_{H2}$) in the furnace atmosphere when the continuous annealing is performed satisfy expression (1) below:

$$1 \leq \log(P_{H2}/P_{H2O}) \leq 4 \quad (1),$$

where $P_{H2}$ represents hydrogen partial pressure (Pa) and $P_{H2O}$ represents water vapor partial pressure (Pa).

* * * * *